United States Patent Office 3,755,395
Patented Aug. 28, 1973

3,755,395
ACETYLENIC DERIVATIVES OF ZINC
Georges Bakassian, and Marcel Lefort, Caluire, France, assignors to Rhone-Poulenc S.A., Paris, France
No Drawing. Filed Sept. 14, 1971, Ser. No. 180,281
Claims priority, application France, Sept. 16, 1970
7033557
Int. Cl. C07f 3/06
U.S. Cl. 260—429.9
6 Claims

ABSTRACT OF THE DISCLOSURE

Solutions of organo-zinc compounds of the formulae:

X—Zn—C≡CH and X—Zn—C≡C—Zn—X where X is halogen, made by reaction of an alkyl zinc halide with acetylene, are used for making acetylenic organo-silicon compounds by reaction with compounds containing silicon-chlorine bonds.

---

The present invention relates to organo-zinc compounds, their preparation, and their use.

The present invention provides solutions, in an organic solvent, of a mixture, in varying proportions, of organo-zinc compounds of formulae:

$$X-Zn-C\equiv CH \quad (I)$$

and $$X-Zn-C\equiv C-Zn-X \quad (II)$$

in which X represents a halogen atom, i.e. iodine, bromine or chlorine. These solutions are produced, in accordance with a feature of the invention, by reacting an alkyl-zinc halide preferably of the formula:

$$R-Zn-X \quad (III)$$

in which R represents a straight or branched alkyl radical of 1 to 4 carbon atoms and X is halogen, with acetylene in an organic solvent medium. The reaction conditions may be varied so as to obtain solutions which contain predominantly one or other of the two organo-zinc compounds.

The alkyl-zinc halide solution can be obtained by methods of working which are known in the art, e.g. by reaction of zinc powder with an alkyl halide of formula RX in an organic solvent. The particular type of halide used influences the choice of solvent. Alkyl iodides, which are the most reactive alkyl halides, react satisfactorily in numerous organic solvents, e.g. aliphatic, cycloaliphatic and aromatic hydrocarbons and cyclic and linear hydrocarbon ethers. Benzene, diethyl ether or tetrahydrofuran is the solvent usually employed; but solvents of higher solvating power, such as dimethoxyethane, dimethylsulphoxide, dimethylformamide, dimethylacetamide, N-methylpyrrolidone or hexamethylphosphotriamide, can be used, but are not necessary, although they accelerate the speed of reaction.

Alkyl-zinc bromides can only be obtained by reaction in solvents of sufficiently high solvating power. Thus, isooctane, dibutyl ether and solvents of high solvating power, such as dimethoxyethane, dimethylsulphoxide, dimethylformamide, dimethylacetamide, N-methylpyrrolidone and hexamethylphosphotriamide are suitable and, for example, tetrahydrofuran is unsuitable [Izvest. Akad. Nauk. USSR 1, 193 (1963)].

Alkyl-zinc chlorides must be prepared in solvents of high solvating power and high dielectric constant. Thus, they have been obtained in dimethylformamide, N-methylpyrrolidone and hexamethylphosphotriamide (see French Pats. Nos. 1,236,115 and 1,547,432). The addition of traces of iodine or of an iodide during the preparation has been recommended because it very markedly assists the reaction.

According to the present invention solutions which contain a mixture of the two organo-zinc compounds of Formulae I and II are obtained by reacting acetylene with a solution of an alkyl-zinc halide of Formula III in an organic solvent at between 30 and 100° C., the solvent being one in which the alkyl-zinc halide of Formula III may be prepared from zinc and alkyl halide. The proportions of the compounds of Formulae I and II depend on the temperature at which the reaction is effected. Solutions obtained by this reaction are referred to hereinafter as solutions (A).

Neither acetylenic zinc compound can be obtained in the pure state, so that the relative proportions of the two compounds can only be estimated indirectly. As will be explained later, this determination may be carried out by reacting the solutions containing the mixed compounds with a chlorotrialkylsilane and measuring the relative proportions of trialkylsilylacetylene and bis(trialkylsilyl)acetylene formed.

Solutions, hereinafter called solutions (B), in which the mono-zinc compound of Formula I predominates are obtained by saturating the solutions (A), maintained at a temperature between 0 and 30° C., with acetylene. By this treatment, solutions (B) are prepared in which more than 90% of the total number of zinc atoms present in the compounds of Formulae I and II are in the mono-zinc compound of Formula I.

Solutions, hereinafter called solutions (C), in which the di-zinc compound of Formula II predominates, are produced by heating the solutions (A) at a temperature of 70° to 150° C., and removing the acetylene produced at the rate at which it is formed. Solutions can thus be obtained in which more than 90% of the total number of zinc atoms present in the compounds of Formulae I and II are in the di-zinc compound of Formula II.

The solutions (A), (B) and (C) can be prepared at varying concentrations up to saturation, but usually contain 20 to 50% by weight of the compounds of Formulae I and II based on the weight of the organic solvent employed.

Solutions of the acetylenic organo-zinc compounds of Formulae I and II are of great industrial interest because of numerous possibilities of using them. In particular, they can be reacted with organosilicon derivatives possessing silicon-chlorine bonds to produce organosilicon derivatives containing an ethinyl or ethinylene group. Suitable organosilicon derivatives are the monochlorosilanes of the formula:

$$ClSiR'_3$$

in which R' can be a hydrogen atom or an organic radical, e.g. a saturated or unsaturated, straight or branched aliphatic hydrocarbon radical, a cycloaliphatic, aromatic or aralkyl radical, or a chloroalkyl, alkoxy, cycloalkoxy, phenoxy or alkylphenoxy radical.

The solutions (B) react with chlorosilanes to produce compounds containing the

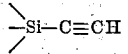

chain.

The solutions (C) react with chlorosilanes to produce acetylenic disilicon compounds containing the

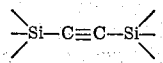

chain.

As has been mentioned above, these results form the basis of a method for the determination of the proportion of the compounds of Formulae I and II in the solutions (A), (B) and (C).

By way of illustration, the following are examples of organochlorosilanes with ethinyl or ethinylene groups which may be obtained according to the invention: dimethylvinylsilylacetylene, dimethylsilylacetylene, triphenylsilylacetylene, dimethylphenylsilylacetylene, dimethylethoxysilylacetylene, methylvinylbutoxyacetylene, bis(trimethylsilyl)acetylene, bis(dimethylsilyl)acetylene, bis(dimethylvinylsilyl)acetylene, bis(dimethylethoxysilyl)acetylene, and bis(methylphenylbutoxysilyl)acetylene.

The solutions of acetylenic organo-zinc compounds of Formulae I and II can also react with siloxane derivatives containing a single Si-Cl bond per silicon atom, to form siloxane compounds with ethinyl or ethinylene groups. Examples of the latter are: 1,1,3,3 - tetramethyl-1,3-diethinyl-siloxane, pentamethyl-3-ethinyl-siloxane, bis(trimethylsiloxydimethylsilyl)acetylene, and bis(dimethylvinylsiloxydimethylsilyl)acetylene.

The examples which follow illustrate the invention.

EXAMPLE 1

1374 g. of zinc powder, 6300 ml. of N-methyl-pyrrolidone and 21 g. of iodine are introduced into a 5 l. flask. The reagents are heated to 90° C. and a stream of methyl chloride is bubbled in at this temperature, at the rate of 25 l./hour, for 25 hours. At the end of this time the zinc has disappeared. The reaction mixture is cooled to 70° C. and a stream of acetylene is passed in at this temperature at the rate of 65 l./hour for 27 hours. Evolution of methane is observed, and 9150 g. of a solution (A) which contains a mixture of ethinyl-zinc chloride and of the di-zinc derivative of dichloroacetylene are thus obtained.

162.5 g. of trimethylchlorosilane are poured over the course of 60 minutes into 700 g. of the solution (A), cooled to 20° C. The mixture is then heated under reflux, and finally distilled. A fraction of boiling point 50–52° C./760 mm. Hg, weighing 56.5 g. and containing pure trimethylsilylacetylene, and a fraction of boiling point 130–134° C./760 mm./Hg, weighing 54 g. and containing pure bis(trimethylsilyl)acetylene, are obtained.

This result shows that in the solution (A) of mono- and di-zinc compounds, 47.5% of the total number of zinc atoms present in the two acetylenic zinc compounds together are in the mono-zinc compound.

EXAMPLE 2

A solution (A) is prepared by the procedure of Example 1, the acetylene being bubbled in at 90° C. instead of 70° C. On the basis of the proportions of silicon derivatives obtained by reaction of an aliquot part of the solution (A) with trimethylchlorosilane, it is calculated that the number of zinc atoms present in the mono-zinc compound corresponds to 48% of the total number of zinc atoms present in the two acetylenic zinc compounds together.

EXAMPLE 3

A stream of acetylene is passed at the rate of 37 l./hour into 9150 g. of solution (A) obtained according to Example 1, at 20° C., for 18 hours. 9170 g. of a solution containing predominantly the mono-zinc compound (solution B) are obtained.

600 g. of this solution (B) are reacted with 155 g. of trimethylchlorosilane at 20° C. for 3 hours with stirring. The reaction mixture is then heated and a fraction of boiling point 50–53° C./760 mm. Hg, weighing 134 g. and containing 118 g. of trimethylsilylacetylene, is collected. On the basis of this result it is calculated that in solution (B) the percentage of zinc atoms contained in the mono-zinc compound is over 90% based on the total number of zinc atoms present in the two zinc compounds.

The solution (B) was used to obtain the following chlorosilanes and siloxane containing an ethinyl group:

3(1) Production of dimethylsilylacetylene 406 g. of dimethylchlorosilane are introduced over the course of 1 hour 30 minutes into a flask containing 1950 g. of solution (B), while the temperature is kept at about 20° C. The reaction mixture is then stirred for 3 hours. Rapid distillation followed by fractional distillation yields 210 g. of pure dimethylsilylacetylene, B.P. 32–35° C./760 mm. Hg.

3(2) Production of dimethylphenylsilylacetylene 170.5 g. of dimethylphenylchlorosilane are poured, over the course of 20 minutes, at about 20° C., into a flask containing 550 g. of solution (B). The mixture is then stirred for 5 hours. Then it is extracted with 3 times 200 ml. of cyclohexane and the cyclohexane solution is fractionally distilled. 86.5 g. of pure dimethylphenylsilylacetylene B.P. 79–82°/18 mm. Hg are thus obtained.

3(3) Production of pentamethylethinylsiloxane 200 g. of pentamethylchlorodisiloxane are poured, over the course of 1 hour, at 18° C., into a reaction flask containing 630 g. of solution (B), and the mixture is heated to 80° C. for 3 hours. Distillation followed by fractional distillation yields 122 g. of pentamethylethinyldisiloxane, B.P. 113–114° C./760 mm. Hg.

EXAMPLE 4

130.5 g. of zinc powder, 600 ml. of N-methylpyrrolidone and 4 g. of iodine are introduced into a reaction flask and 218 g. of ethyl bromide are run in over the course of 60 minutes while the temperature is kept at 80–90° C. When the reaction mixture has been brought to 70° C., a stream of acetylene is bubbled in at the rate of 40 l./hour for 6 hours, while the temperature is kept constant. During the reaction, evolution of ethane is observed. The solution is then cooled to 28° C. and a stream of acetylene is again bubbled in at the rate of 35 l./hour for 7 hours.

If 206 g. of trimethylchlorosilane are added over the course of 45 minutes at about 30° C. and the reaction mixture is then fractionally distilled, 50 g. of trimethylsilylacetylene, B.P. 50–54° C., are obtained.

EXAMPLE 5

9150 g. of solution (A) are prepared in accordance with the procedure of Example 1, and 617 g. thereof are taken and heated for 3 hours 30 minutes at 110° C. under reduced pressure, which is 120 mm. Hg at the start and is gradually reduced to 25 mm. Hg at the end of the process. A solution of the acetylenic di-zinc reagent (solution C) is thus obtained. 162 g. of trimethylchlorosilane are added to it at a temperature of about 25° C., and the reaction mixture is then heated for 1 hour 30 minutes to 80–90° C. Fractional distillation yields a first fraction, B.P. 130–134° C./760 mm. Hg containing 77.5 g. of bis(trimethylsilyl)acetylene. This result shows that, in the solution (C), the percentage of zinc atoms present in the di-zinc compound is over 90% based on the total number of zinc atoms present in the acetylenic organo-zinc compounds.

Two further solutions (C) are prepared from aliquot fractions of solution (A) and are used to obtain various bis(silyl)acetylenes as follows:

5(1) Production of bis(dimethylsilyl)acetylene 133 g. of dimethylchlorosilane are run at 20° C., over the course of 1 hour 45 minutes, into a flask containing a solution (C) obtined from 617 g. of the zinc solution (A), and the mixture is then stirred for 3 hours. Distillation followed by fractional distillation yields 52 g. of bis(dimethylsilyl)acetylene B.P. 116–117° C./760 mm. Hg.

5(2) Production of bis(dimethylvinylsilyl)acetylene 470 g. of dimethylvinylchlorosilane are run at 20° C., over the course of 2 hours, into a flask containing a solution (C) obtained from 1744 g. of the zinc solution (A), and the reaction mixture is then heated at 80° C. for 3 hours. Distillation followed by fractional distillation yields 224.5 g. of bis(dimethylvinylsilyl)acetylene, B.P. 64–68° C./15 mm. Hg.

EXAMPLE 6

63.5 g. of zinc powder, 1 g. of iodine and methyl chloride in 300 g. of hexamethylphosphotriamide are reacted in the manner described in Example 1 (the methyl chloride being introduced at the same rate) until the zinc has disappeared. Acetylene is introduced into the solution at the rate of 20 l./hour for 5 hours, then to 15° C. for 4 hours. A solution (B) containing predominantly ethynyl monozinc chloride is thus obtained.

103 g. of trimethylchlorosilane are gradually introduced into this solution and the whole is then kept at 17° C. for 3 hours with stirring. Fractional distillation yields 70 g. of a fraction B.P. 50–55° C./ 760 mm. Hg, containing 51 g. of trimethylsilylacetylene. No bis(trimethylsilyl)acetylene was obtained.

We claim:

1. A solution in an organic solvent of a mixture of organo-zinc compounds of formulae $$X-Zn-C\equiv CH \qquad (I)$$

and $$X-Zn-C\equiv C-Zn-X \qquad (II)$$

in which X represents a halogen atom.

2. A solution according to claim 1 in which the proportion of zinc atoms present in the mono-zinc compound of Formula I is over 90% of the total number of zinc atoms present in the two acetylenic zinc compounds of Formulae I and II.

3. A solution according to claim 1 in which the proportion of zinc atoms present in the di-zinc compound of Formula II is over 90% of the total number of zinc atoms present in the two acetylenic zinc compounds of Formulae I and II.

4. Process for the preparation of a solution of a mixture of organo-zinc compounds of formulae $$X-Zn-C\equiv CH \qquad (I)$$

and $$X-Zn-C\equiv C-Zn-X \qquad (II)$$

in which X represents a halogen atom, which comprises reacting acetylene, at 30 to 100° C., with a solution of an alkyl-zinc halide in an organic solvent, the solvent being one in which the alkyl-zinc halide may be prepared from zinc and alkyl halide.

5. Process for the preparation of a solution in an organic solvent of a mixture of organo-zinc compounds of formulae:

$$X-Zn-C\equiv CH \qquad (I)$$

and $$X-Zn-C\equiv C-Zn-X \qquad (II)$$

in which X represents a halogen atom and over 90% of the zinc atoms present in the compounds of Formulae I and II are present in the mono-zinc compounds of Formula I, which comprises reacting acetylene at 30° to 100° C. with a solution of an alkyl-zinc halide in an organic solvent, the solvent being one in which the alkyl-zinc halide may be prepared from zinc and alkyl halide, and reacting more acetylene with the solution obtained at 0° to 30° C.

6. Process for the preparation of a solution in an organic solvent of a mixture of organo-zinc compounds of formulae:

$$X-Zn-C\equiv CH \qquad (I)$$

and $$X-Zn-C\equiv C-Zn-X \qquad (II)$$

in which X represents a halogen atom and over 90% of the zinc atoms present in the compounds of Formulae I and II are present in the di-zinc compound of Formula II, which comprises reacting acetylene at 30° to 100° C. with a solution of an alkyl-zinc halide in an organic solvent, the solvent being one in which the alkyl-zinc halide may be prepared from zinc and alkyl halide, and heating the solution obtained to 70° to 150° C. while the acetylene produced is removed at the rate at which it is formed.

References Cited

UNITED STATES PATENTS

| | | | |
|---|---|---|---|
| 2,845,462 | 7/1958 | Oroshnik | 260—429.9 X |
| 2,942,015 | 6/1960 | Petree | 260—429.9 |
| 3,020,298 | 2/1962 | Ashby et al. | 260—429.9 X |
| 3,538,134 | 11/1970 | Tedeschi et al. | 260—438.1 |

HELEN M. S. SNEED, Primary Examiner

U.S. Cl. X.R.

252—188; 260—448.2 Q